(12) United States Patent
Rothberg

(10) Patent No.: US 6,687,850 B1
(45) Date of Patent: Feb. 3, 2004

(54) DISK DRIVE FOR STORING SECTOR-RECONSTRUCTION SECTORS AND FOR STORING A SECTOR-RECONSTRUCTION STATUS IN SECTORS DISTRIBUTED AROUND A DISK

(75) Inventor: Michael S. Rothberg, Foothill Ranch, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 549 days.

(21) Appl. No.: 09/773,939

(22) Filed: Jan. 31, 2001

(51) Int. Cl.$^7$ ................................................. G06F 11/00
(52) U.S. Cl. ................................. 714/6; 714/5; 360/53
(58) Field of Search ............................. 714/5, 6, 766, 714/769; 360/53

(56) References Cited

U.S. PATENT DOCUMENTS

| | | | | |
|---|---|---|---|---|
| 5,220,569 A | * | 6/1993 | Hartness | 714/758 |
| 5,392,290 A | * | 2/1995 | Brown et al. | 714/6 |
| 5,644,767 A | * | 7/1997 | Rathunde | 713/1 |
| 5,751,733 A | * | 5/1998 | Glover | 714/765 |
| 5,872,800 A | | 2/1999 | Glover et al. | |
| 5,889,934 A | * | 3/1999 | Peterson | 714/6 |
| 6,061,194 A | * | 5/2000 | Bailey | 360/47 |
| 6,192,484 B1 | * | 2/2001 | Asano | 714/6 |

* cited by examiner

Primary Examiner—Scott Baderman
Assistant Examiner—Joshua Lohn
(74) Attorney, Agent, or Firm—Milad G. Shara, Esq.; Howard H. Sheerin, Esq.

(57) ABSTRACT

A disk drive is disclosed comprising a disk, a head, and an actuator for actuating the head radially over the disk. The disk comprises a plurality of tracks, wherein each track comprises a plurality of sectors. The plurality of sectors comprise a plurality of data sectors for storing data and at least one sector-reconstruction (SR) sector for storing redundancy data generated in response to the data stored in at least one of the data sectors. At least two of the plurality of sectors of a track are for storing a SR status indicating a validity of the SR sector stored on the track.

39 Claims, 13 Drawing Sheets

$D_{X,Y}$ : X is the interleave number;
Y is the sector number within the interleave.
$SRI_Z$ : Z is the interleave number.

$D_{X,Y}$ : X is the interleave number;
Y is the sector number within the interleave.
$SRI_Z$ : Z is the interleave number.

$D_{X,Y}$ : X is the interleave number;
Y is the sector number within the interleave.
$SRI_Z$ : Z is the interleave number.

OFF-LINE SCAN

DISK DRIVE FOR STORING SECTOR-RECONSTRUCTION SECTORS AND FOR STORING A SECTOR-RECONSTRUCTION STATUS IN SECTORS DISTRIBUTED AROUND A DISK

BACKGROUND OF THE INVENTION

1. Field of the Invention

The present invention relates to disk drives for computer systems. More particularly, the present invention relates to a disk drive for storing sector-reconstruction sectors and for storing a sector-reconstruction status in sectors distributed around a disk.

2. Description of the Prior Art

A disk drive comprises a disk for storing data in radially spaced, concentric tracks. Each track is partitioned into a plurality of data sectors, and user data is written to the disk a sector at a time. A special timing pattern referred to as a preamble as well as a sync mark are recorded at the beginning of each data sector to facilitate synchronizing to the data during read back. A sector level error correction code (ECC), such as a Reed-Solomon code, is also typically employed to detect and correct errors in the data induced by imperfections in the recording and reproduction process. With the sector level ECC, special redundancy symbols are generated over the user data during a write operation and then recorded with the user data in a data sector. During read back, the redundancy symbols are used to detect and correct errors in the user data. However, if the number of errors exceeds the correction power of the sector level ECC, or if the preamble or sync mark in the data sector is unreadable, the data sector becomes unrecoverable at the sector level.

U.S. Pat. No. 5,872,800 discloses track level parity for reconstructing a data sector unrecoverable at the sector level. With the track level parity, each track comprises a parity sector for storing track level parity generated over the data sectors in the track. A data sector unrecoverable at the sector level can be reconstructed at the track level by computing the parity over the other data sectors together with the parity sector.

FIG. 1A shows a prior art disk drive comprising a disk 4, a head 6, and an actuator 8 for actuating the head 6 radially over the disk 4. The disk 4 comprises a plurality of radially spaced, concentric data tracks each comprising a plurality of data sectors (e.g., $D_0-D_{14}$) and a track level parity (TP) sector. The disk 4 is partitioned into a plurality of zones (e.g., inner zone 10 and outer zone 12) wherein the data rate is increased from the inner to outer zones in order to achieve a more constant linear bit density. As shown in FIG. 1B, each data sector comprises a preamble field 14 and a sync mark field 16 for use in synchronizing to user data stored in a data field 18. ECC redundancy symbols 20 are appended to the end of the data sector and used to detect and correct errors in the user data during read back. The TP sector stores parity data generated over the data stored in the data sectors (e.g., $D_0-D_{14}$). The TP sector also stores a TP status bit S 22 which indicates the validity of the TP sector.

The '800 patent also discloses to cache write parity (WP) sectors to improve performance by avoiding the rotational latency associated with updating the TP sector of a track. Multiple writes to the same track will update the cached WP sector rather than rewriting the TP sector to the disk. The cached TP sectors are regenerated and written to the disk during idle time, thereby avoiding the rotational latency of writing the TP sectors during normal write operations. When a WP sector is cached, a TP status (bit S 22 of FIG. 1A) is updated in the TP sector stored on the disk to indicate that the disk TP sector is no longer valid. This prevents the use of the disk TP sector in the event the cached WP sector is lost due to a power failure. However, there is an undesirable rotational latency associated with storing the TP status in the disk TP sector at the end of a normal write operation. The disk drive must wait for the disk to rotate until the head reaches the TP sector in order to write the TP status to the disk TP sector.

There is, therefore, a need to reduce the rotational latency associated with storing a status of a sector used to reconstruct other sectors in a disk drive.

SUMMARY OF THE INVENTION

The present invention may be regarded as a disk drive comprising a disk, a head, and an actuator for actuating the head radially over the disk. The disk comprises a plurality of tracks, wherein each track comprises a plurality of sectors. The plurality of sectors comprise a plurality of data sectors for storing data and at least one sector-reconstruction (SR) sector for storing redundancy data generated in response to the data stored in at least one of the data sectors. At least two of the plurality of sectors of a track are for storing a SR status indicating a validity of the SR sector stored on the track.

In one embodiment, the at least one SR sector comprises a plurality of sector-reconstruction-interleave (SRI) sectors for storing redundancy data. The redundancy data stored in each SRI sector is generated in response to the data stored in an interleave of the data sectors, and the plurality of SRI sectors for storing the SR status. In one embodiment, the redundancy data stored in at least one of the SRI sectors is generated by computing a parity over the data stored in an interleave of the data sectors. In an alternative embodiment, the data stored in each interleave of the data sectors represent data polynomials, and the redundancy data stored in the SRI sectors is generated by dividing the data polynomials by a generator polynomial. In one embodiment, when the disk drive receives write data from a host to be written to a track on the disk, the disk drive generates a write-reconstruction (WR) sector over the write data and stores the WR sector in the semiconductor memory. The disk drive writes the write data to at least one of the plurality of data sectors, and the disk drive writes the SR status to at least one of the at least two sectors for storing the SR status.

The present invention may also be regarded as a disk drive comprising a disk comprising a plurality of tracks, each track comprising a plurality of sectors, the plurality of sectors comprise a plurality of data sectors for storing data and at least one sector-reconstruction (SR) sector for storing redundancy data generated in response to the data stored in at least one of the data sectors. The disk drive further comprises a head, an actuator for actuating the head radially over the disk, and a disk controller. The disk controller for writing data to the data sectors, writing the redundancy data to the SR sector, and writing an SR status to at least two of the plurality of sectors, the SR status indicating a validity of the SR sector.

The present invention may also be regarded as a disk controller for use in a disk drive. The disk drive comprising a disk comprising a plurality of tracks, each track for storing a plurality of sectors, the plurality of sectors comprise a plurality of data sectors for storing data and at least one sector-reconstruction (SR) sector for storing redundancy data generated in response to the data stored in at least one of the data sectors, a head, and an actuator for actuating the head radially over the disk. The disk controller comprising a means for writing data to the data sectors, a means for writing the redundancy data to the SR sector, and a means for writing an SR status to at least two of the plurality of sectors, the SR status indicating a validity of the SR sector.

DESCRIPTION OF THE PREFERRED EMBODIMENTS

Figure 4:
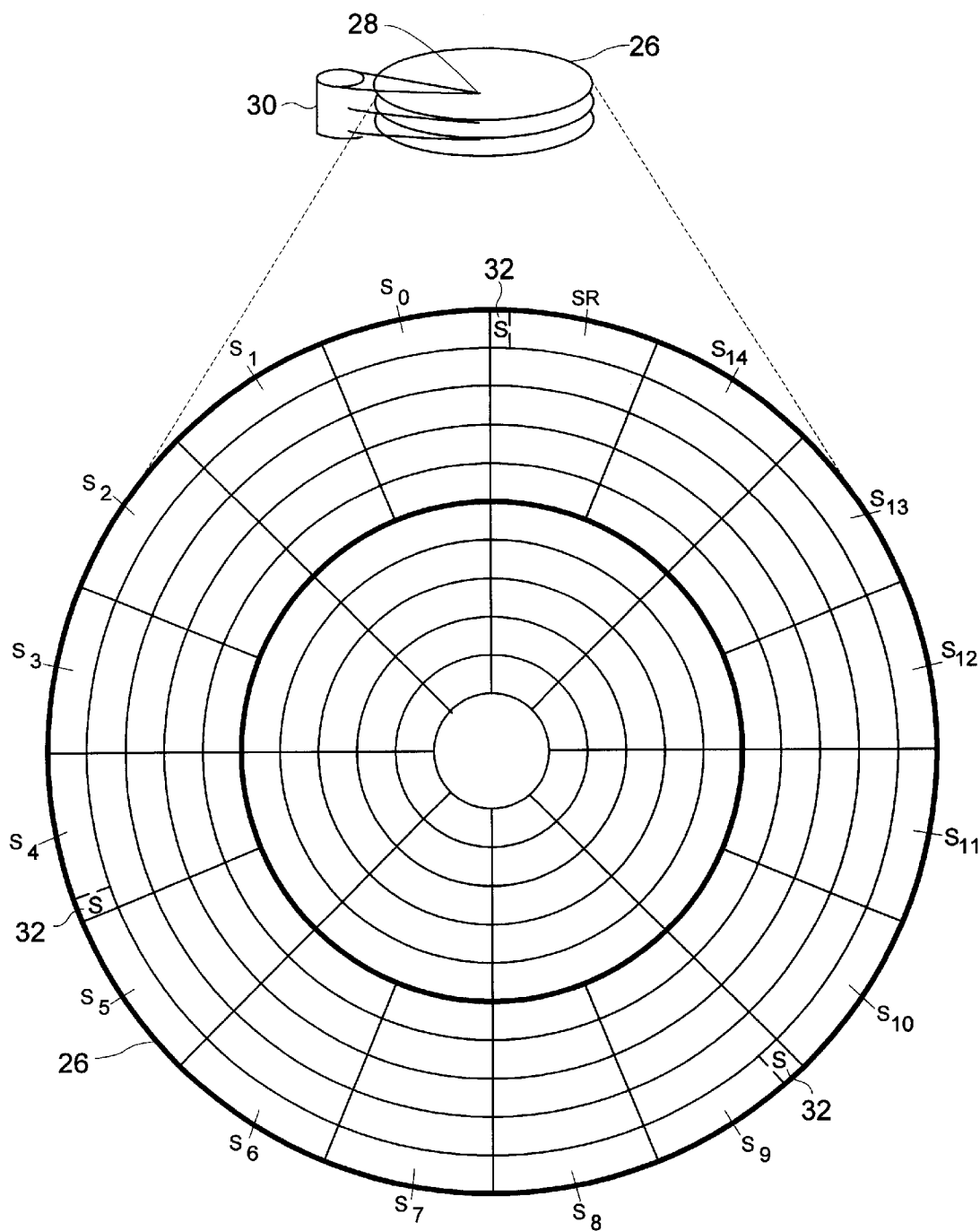
FIG. 4 shows a disk drive according to an alternative embodiment of the present invention, wherein at least two sectors of a track for storing a SR status indicating a validity of a sector-reconstruction (SR) sector, such as an SRI sector or an SRA sector, thereby reducing the rotational latency associated with updating the SR status.

FIG. 4 shows a disk drive comprising a disk 26, a head 28, and an actuator 30 for actuating the head 28 radially over the disk 26. The disk 26 comprises a plurality of tracks, wherein each track comprises a plurality of sectors. The plurality of sectors comprise a plurality of data sectors for storing data and at least one sector-reconstruction (SR) sector for storing redundancy data generated in response to the data stored in at least one of the data sectors. At least two of the plurality of sectors of a track are for storing a SR status 32 indicating a validity of the SR sector stored on the track.

Figure 2:
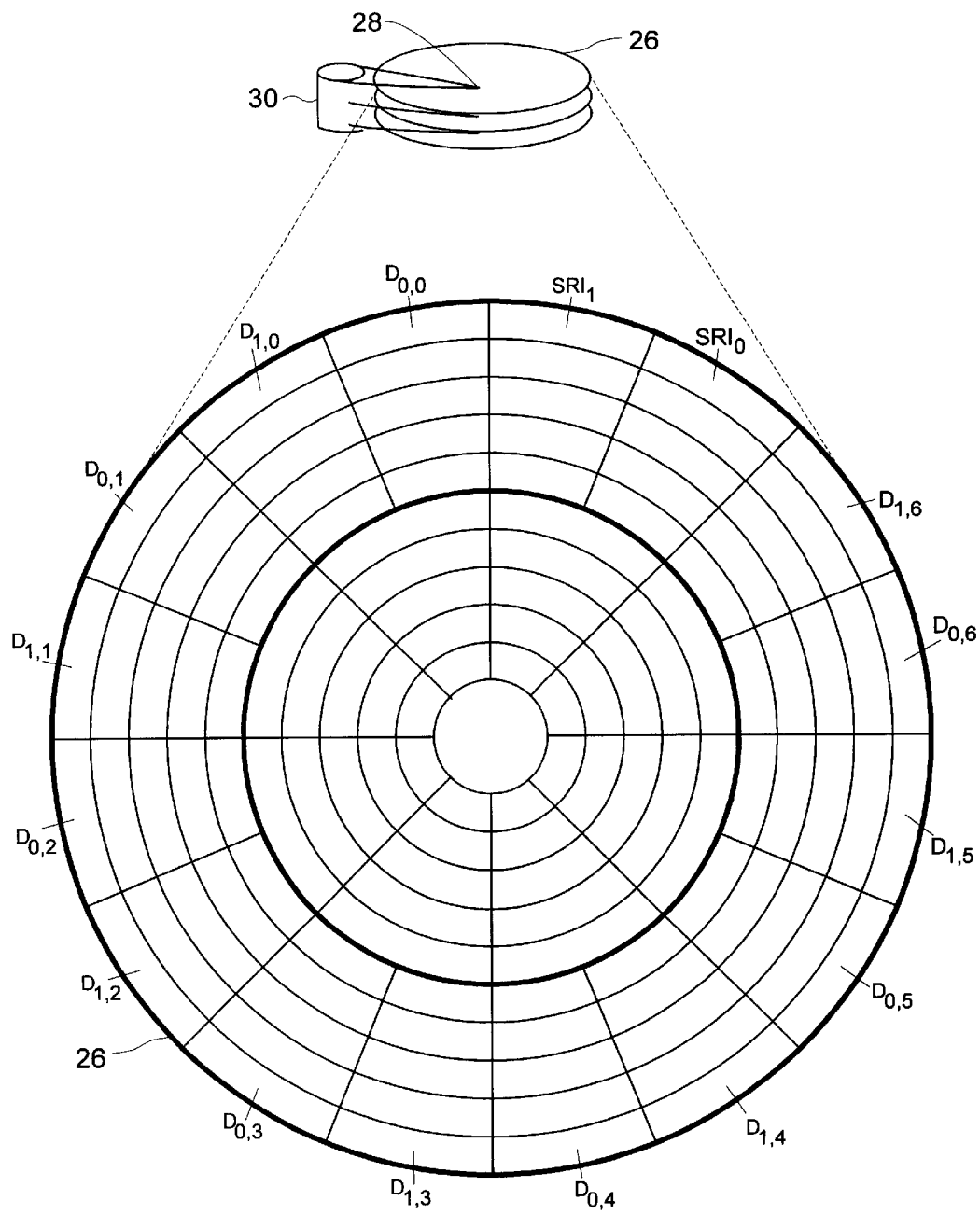
FIG. 2 shows a disk drive according to an embodiment of the present invention comprising a disk for storing a plurality of tracks comprising a plurality of data sectors for storing data and a plurality of sector-reconstruction-interleave (SRI) sectors for storing redundancy data generated in response to the data stored in an interleave of the data sectors.

In the embodiment shown in FIG. 2, each track on the disk 26 comprises two SRI sectors $SRI_0$ sector and $SRI_1$ sector, wherein $SRI_0$ sector stores redundancy data generated in response to data stored in a first interleave of data sectors comprising sectors [0, 2, 4, . . . ], and $SRI_1$ sector stores redundancy data generated in response to data stored in a second interleave of data sectors comprising sectors [1, 3, 5, . . . ]. In FIG. 2, the data sectors are numbered Dx, y where x is the interleave number and y is the sector number within the interleave.

Any suitable number of interleaves may be employed. In one embodiment, three SRI sectors are employed corresponding to three interleaves of data sectors. The first interleave of data sectors comprises data sectors [0, 3, 6, . . . ], the second interleave of data sectors comprises data sectors [1, 4, 7, . . . ], and the third interleave of data sectors comprises data sectors [2, 5, 8, . . . ]. In general, n SRI sectors are employed corresponding to n interleaves of the data sectors, n is greater than three, and each interleave of data sectors comprises every nth data sector offset by the interleave number.

More data sectors in a track can be reconstructed as the number of interleaves increases. In one embodiment, the SRI sector stores a parity generated over the data stored in an interleave of the data sectors. Each SRI parity sector is capable of reconstructing a single data sector within the corresponding interleave. In the embodiment comprising two interleaves, two consecutive data sectors corrupted by a long medium defect can be reconstructed since they fall within the two different interleaves.

Any suitable method for computing the redundancy data stored in the SRI sectors may be employed. In the embodiment wherein the redundancy data comprises parity data, any suitable method may be employed to generate the parity data, including to exclusive-or each bit in the data sectors.

In another embodiment, the data stored in each interleave of the data sectors represent data polynomials, and the redundancy data stored in the SRI sectors is generated by dividing the data polynomials by a generator polynomial. Any suitable generator polynomial may be employed, including any of the generator polynomials employed in Reed-Solomon error correction codes. In one embodiment, the data sectors store a plurality of multi-bit values representing coefficients of a data polynomial. In one embodiment, each byte of a data sector represents a coefficient of a data polynomial and the corresponding bytes in the remaining data sectors within the interleave represent the other coefficients of the data polynomial. In one embodiment, the redundancy data corresponding to one of the data polynomials comprises a plurality of multi-bit values stored in a plurality of SRI sectors.

Figure 3:
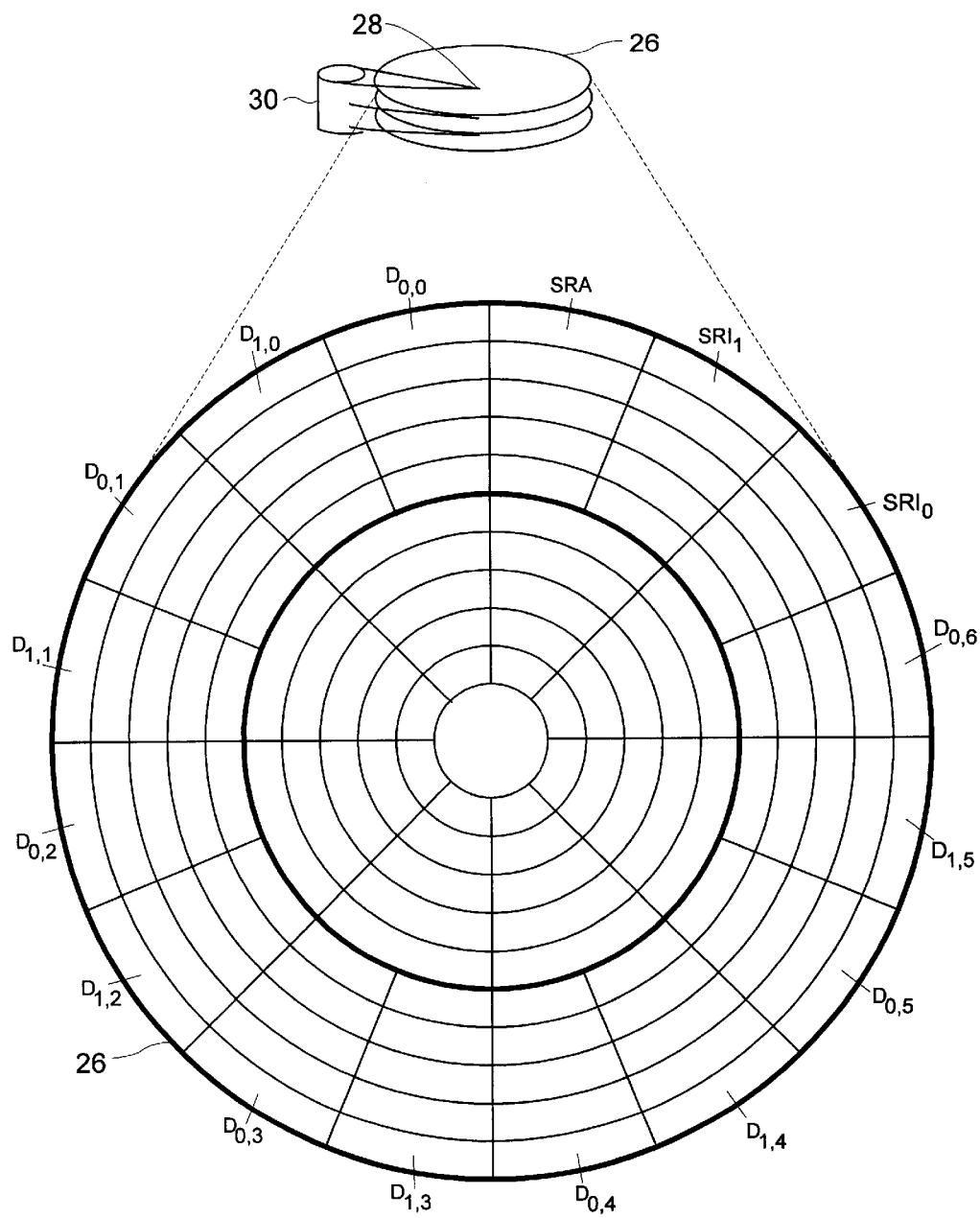
FIG. 3 shows a disk drive according to an alternative embodiment of the present invention, wherein each track further stores a sector-reconstruction-all (SRA) sector for storing redundancy data generated over the data stored in at least two of the interleaves of the data sectors.

In another embodiment shown in FIG. 3, at least one of the tracks on the disk 26 further comprises a sector-reconstruction-all (SRA) sector for storing redundancy data generated in response to the data stored in at least two of the interleaves of the data sectors of the track. In one embodiment, the SRA sector stores parity data generated over at least two of the interleaves of the data sectors of the track. In one embodiment, the SRA sector is used to verify a data sector reconstructed using at least one of the SRI sectors. This embodiment helps to detect miscorrections by the sector level ECC when reconstructing a data sector using an SRI sector. The reconstructed sector, together with the other data sectors, should combine in a manner consistent with the SRA sector. In the embodiment where the SRA sector stores parity data, the exclusive-or of the reconstructed data sector, together with the other data sectors and the SRA sector should result in zero. Otherwise, the sector level ECC miscorrected a data sector during the reconstruction procedure.

In another embodiment, in order to reduce the rotational latency associated with updating the sector recovery (SR) sector(s) during every write operation to the same track, a write-reconstruction (WR) sector is cached in a semiconductor memory and used to reconstruct unrecoverable data sectors. The WR sector comprises redundancy data generated over new data sectors written to a track. During idle time, the disk drive performs a read-verify operation to verify that the newly written data sectors to a track can be recovered. If not, the WR sector is used to reconstruct the newly written data sector. The SR sector(s) is then regenerated for the entire track and written to the track.

When a new data sector is written to a track the SR status 32 (FIG. 4) is also written to the track in order to invalidate the SR sector(s). This prevents using an invalid SR sector to reconstruct a data sector in the event the WR sector is lost during a power failure. In order to reduce the rotational latency associated with updating the SR status written to the disk, at least two sectors of a track store the SR status 32 indicating the validity of the SR sector(s) of the track. During a write operation, the disk drive updates one of the SR status 32, for example, the SR status 32 nearest the last sector written to the disk, or the nearest SR status 32 once the head 28 reaches the target track. This reduces and in some instances eliminates the rotational latency associated with updating the SR status 32.

In one embodiment, the SR status 32 is stored in every sector on the disk, that is, as part of the sector format. This embodiment essentially eliminates any rotational latency involved with updating the SR status 32 since the SR status 32 is updated with every sector written to the disk. In another embodiment shown in FIG. 5, each track comprises a plurality of SRI sectors distributed around the disk as well as an SRA sector. The status of the SR sectors is invalidated by writing spurious data to one of the SR sectors. Before using one of the SRI sectors to reconstruct a sector, the status of the SRI sector is verified by combining the SRI sectors with the SRA sector. In the embodiment wherein the SRI and SRA sectors store parity data, the exclusive-or of these sectors should be zero; otherwise, the SRI sectors are deemed invalid.

Figure 5:
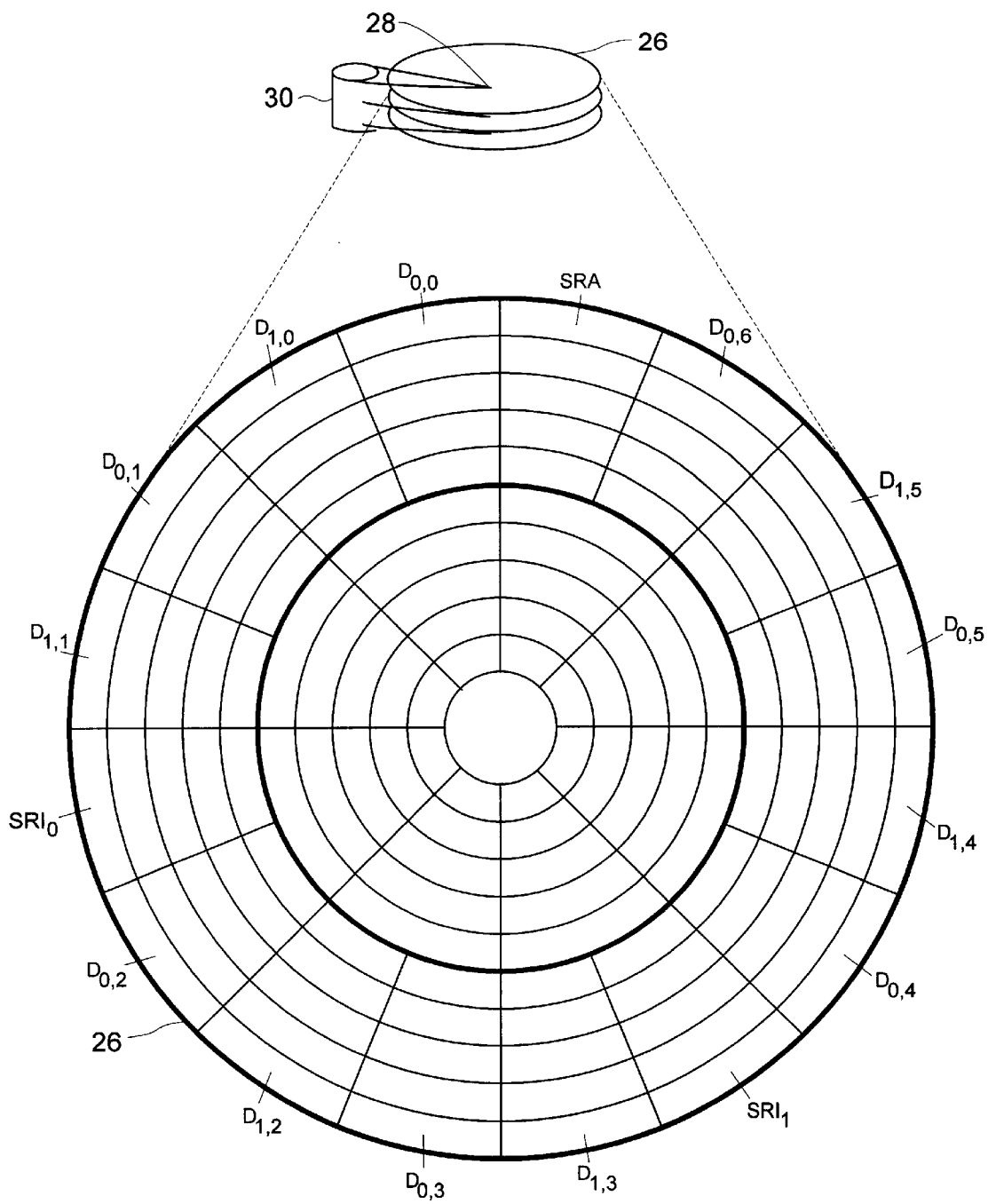
FIG. 5 shows a disk drive according to an embodiment of the present invention, wherein the SR status is updated by writing spurious data to at least one SR sector, such as an SRI sector or an SRA sector.
Figure 6:
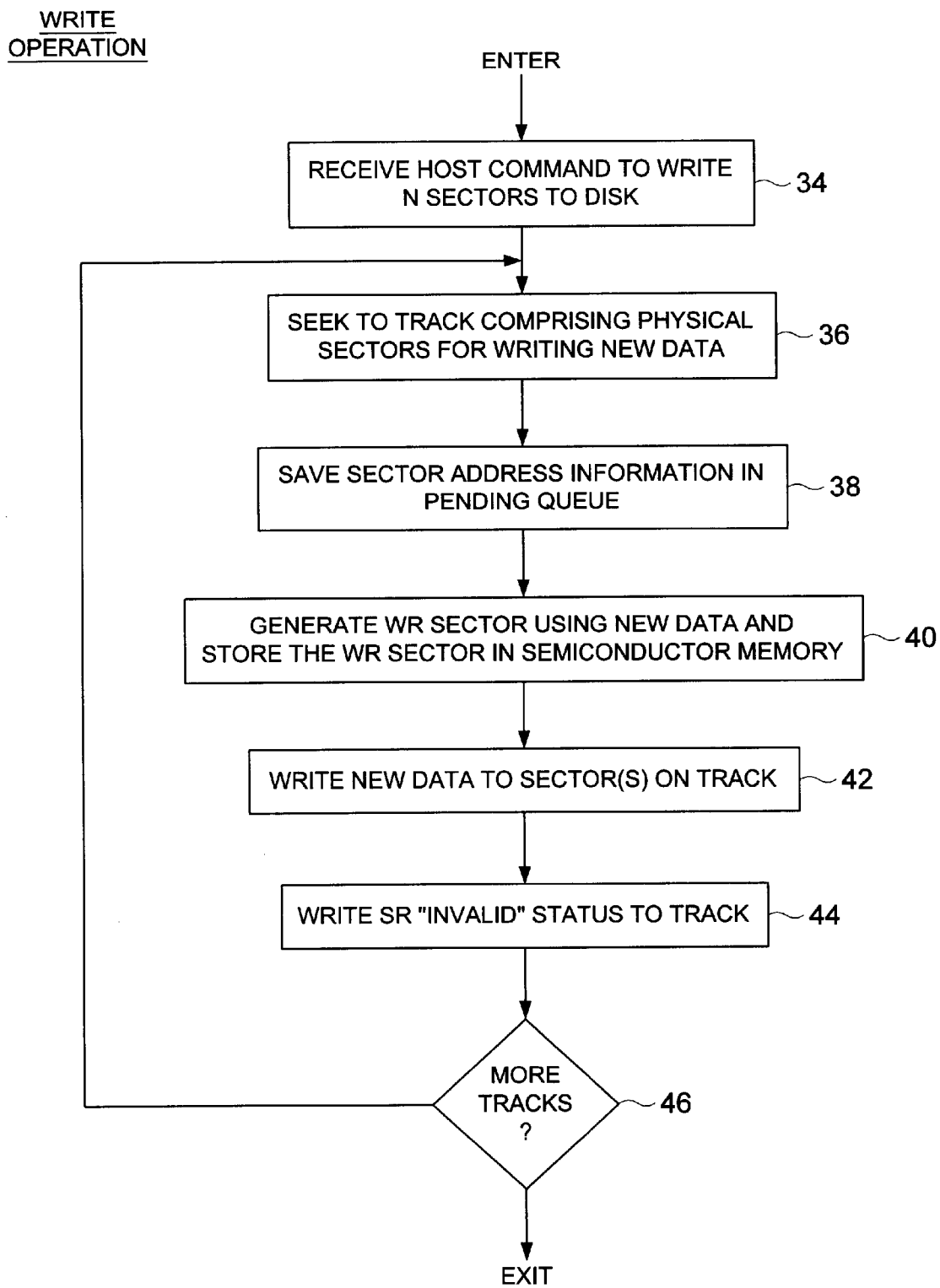
FIG. 6 shows a flow chart for writing new data to a track and updating the SR status according to an embodiment of the present invention.

FIG. 6 is a flow diagram illustrating the steps executed by the disk drive during a write operation according to an embodiment of the present invention. At step 34 the disk drive receives a command from the host computer to write N sectors of data to the disk 26. At step 36 the disk drive seeks the head 28 to the first track comprising the physical sectors for writing the new data. At step 38 the address of the sectors to be overwritten are saved in a pending queue which is stored in a semiconductor memory. At step 40 a write-reconstruction (WR) sector is generated using the new data to be written to the track, and the WR sector is stored in the semiconductor memory. At step 42 the new data is written to the sector(s) on the track, and at step 44 the SR status is updated to "INVALID" and the SR status is written to the track. In one embodiment, an SR status field in one of a plurality of sectors is written with an "INVALID" flag (FIG. 4). In an alternative embodiment, spurious data is written to one of the SR sectors so that the SRA sector will indicate the SR sectors are invalid (FIG. 5). In both embodiments, the rotational latency required to update the SR status on the track is reduced since the SR status is updated in one of a plurality of sectors distributed around the disk. If at step 46 there are more tracks to be written, then the process reiterates starting at step 36 by seeking the head 28 to the next track. Otherwise, the write operation terminates.

Figure 7:
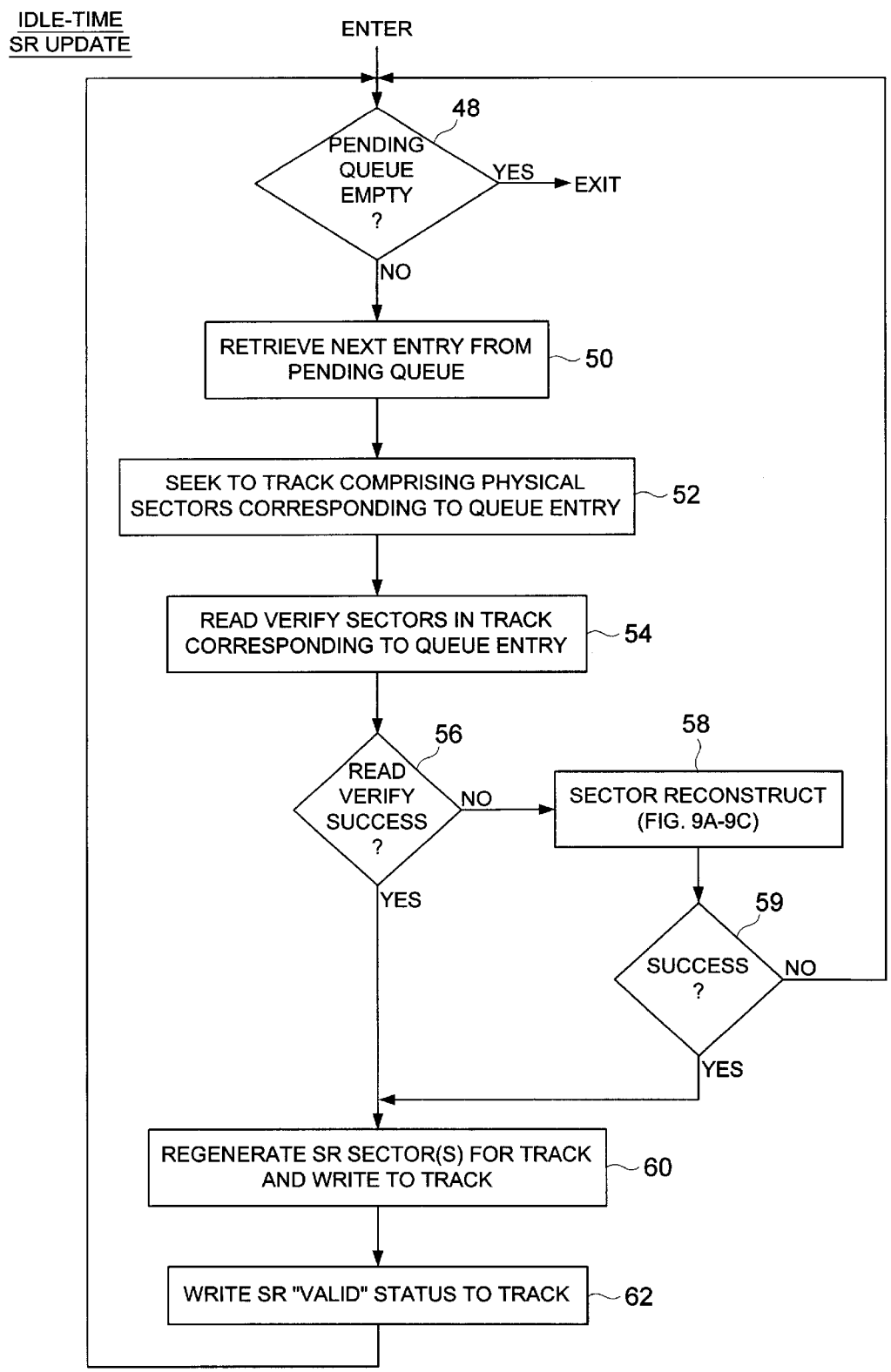
FIG. 7 shows a flow chart for updating the SR sectors and the SR status during idle-time of the disk drive according to an embodiment of the present invention.

FIG. 7 is a flow diagram executed by the disk drive during idle-time according to an embodiment of the present invention. If at step 48 the pending queue is empty, meaning that there are no tracks wherein the SR sector(s) needs updating, then the idle-time procedure exits. Otherwise at step 50 the first entry in the queue is retrieved and at step 52 the disk drive seeks the head 28 to the track comprising the physical sectors corresponding to the queue entry. At step 54 the disk drive performs a read-verify operation in order to verify that all of the data sectors in the queue entry can be read. If at step 56 the read-verify is unsuccessful, then at step 58 a sector reconstruction procedure (FIGS. 9A–9C) is executed in an attempt to reconstruct one or more of the unrecoverable data sectors using the SR sector(s). If the read-verify is successful at step 56, or if the unrecoverable data sectors are successfully recovered at step 59, then at step 60 the SR sector(s) for the entire track are regenerated and written to the track. At step 62 the SR status is updated to "VALID" and written to the track to indicate that the SR sector(s) stored on the disk may now be used to reconstruct an unrecoverable data sector encountered during a subsequent read operation. The process then reiterates starting at step 48 for the next entry in the pending queue. If at step 59 the sector reconstruction procedure was not successful, then the process reiterates starting at step 48 without updating the SR sector for the current track.

Figure 8:
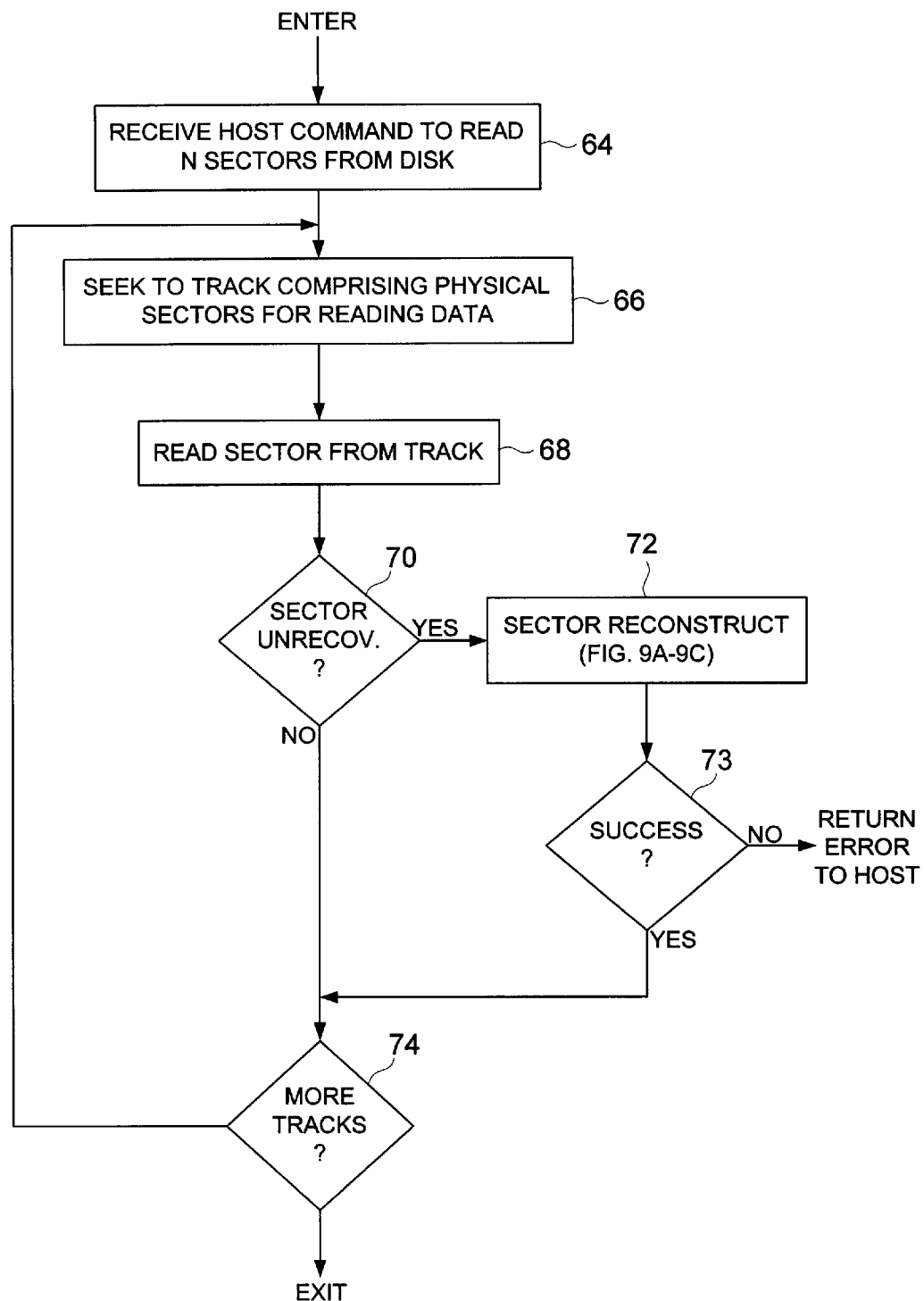
FIG. 8 shows a flow chart illustrating a read operation according to an embodiment of the present invention wherein an SR sector is used to reconstruct a data sector unrecoverable at the sector level.

FIG. 8 is a flow diagram executed by the disk drive during a read operation according to an embodiment of the present invention. At step 64 the disk drive receives a command from the host computer to read N sectors from the disk 26. At step 66 the disk drive seeks the head 28 to the first track comprising the physical sectors for reading the data, and at step 68 the disk drive attempts to read the data sectors from the track. If at step 70 one or more of the data sectors are unrecoverable at the sector level, then at step 72 a sector reconstruction procedure (FIGS. 9A–9C) is executed in an attempt to reconstruct the unrecoverable data sectors using the SR sector(s). If at step 73 the sector reconstruction procedure was unsuccessful, an error is returned to the host computer system. Otherwise if at step 74 more tracks are to be read, then the process reiterates starting at step 66 by seeking the head 28 to the next track.

Figure 9A:
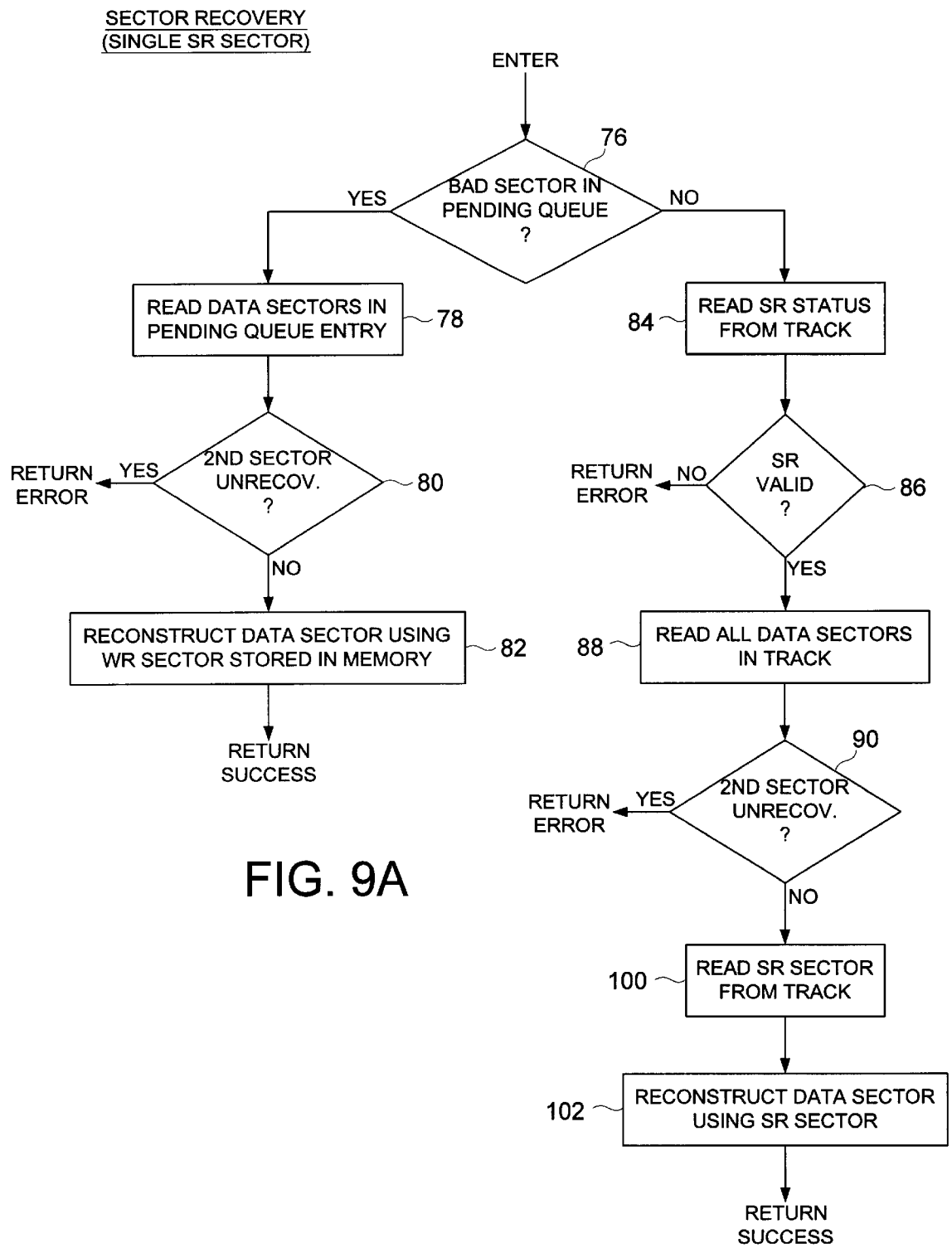
FIG. 9A shows a flow chart illustrating a sector reconstruction procedure using a single SR sector according to an embodiment of the present invention.

FIG. 9A is a flow diagram executed by the disk drive to reconstruct an unrecoverable data sector using a single SR sector (e.g., the SR sector stores parity data). If at step 76 the unrecoverable data sector is in an entry of the pending queue, meaning that it was recently written to the disk, then the corresponding WR sector stored in the semiconductor memory is used to reconstruct the data sector. At step 78 the disk drive attempts to read the data sectors in the pending queue entry (except the unrecoverable data sector). In one embodiment, the disk drive attempts to read the data sectors at step 78 by correcting errors on-the-fly using the sector level ECC. If a data sector is unrecoverable on-the-fly, then the disk drive executes an off-line retry procedure in an attempt to recover the data sector. The off-line retry procedure adjusts various parameters in the disk drive (e.g., in the read channel) and attempts to reread the data sector. If after executing the off-line retry procedure a second data sector is still unrecoverable at step 80, then an error is returned. Otherwise, at step 82 the first unrecoverable data sector is reconstructed using the WR sector stored in the semiconductor memory. The data sectors read from the disk at step 78 are combined with the WR sector in a suitable manner so as to reconstruct the data sector. In the embodiment wherein the WR sector stores parity data, the data sectors read at step 78 and the WR sector are exclusive-ored to reconstruct the unrecoverable data sector. In the embodiment wherein the WR sector stores multi-bit redundancy values of a more complex error correction code (e.g., Reed-Solomon), the data sectors read at step 78 together with the WR sector are processed to generate error syndromes used to reconstruct the unrecoverable data sector.

If at step 76 the unrecoverable data sector is not in the pending queue, then at step 84 the SR status, which indicates the validity of the SR sector, is read from the track. If at step 86 the SR status is INVALID, it means a WR sector stored in the semiconductor memory during a previous write operation has been lost due, for example, to a power failure. The SR sector stored on the disk is invalid since data has been written to the track without updating the SR sector, therefore the SR sector cannot be used to reconstruct the unrecoverable data sector and an error is returned. If at step 86 the SR status is VALID, then at step 88 the disk drive reads all of the data sectors in the track (except the unrecoverable data sector). Similar to step 78, the disk drive performs off-line retry operations when necessary to recovery a data sector. If a second unrecoverable data sector is encountered at step 90 (even after the off-line retry operation), then the first unrecoverable data sector cannot be reconstructed using the SR sector and an error is returned. Otherwise, at step 100 the SR sector is read from the track and used at step 102 to reconstruct the unrecoverable data sector. The data sectors read from the disk at step 88 are combined with the SR sector in a suitable manner so as to reconstruct the data sector. In the embodiment wherein the SR sector stores parity data, the data sectors read at step 88 and the SR sector are exclusive-ored to reconstruct the unrecoverable data sector. In the embodiment wherein the SR sector stores multi-bit redundancy values of a more complex error correction code (e.g., Reed-Solomon), the data sectors read at step 88 together with the SR sector are processed to generate error syndromes used to reconstruct the unrecoverable data sector.

Figure 9B:
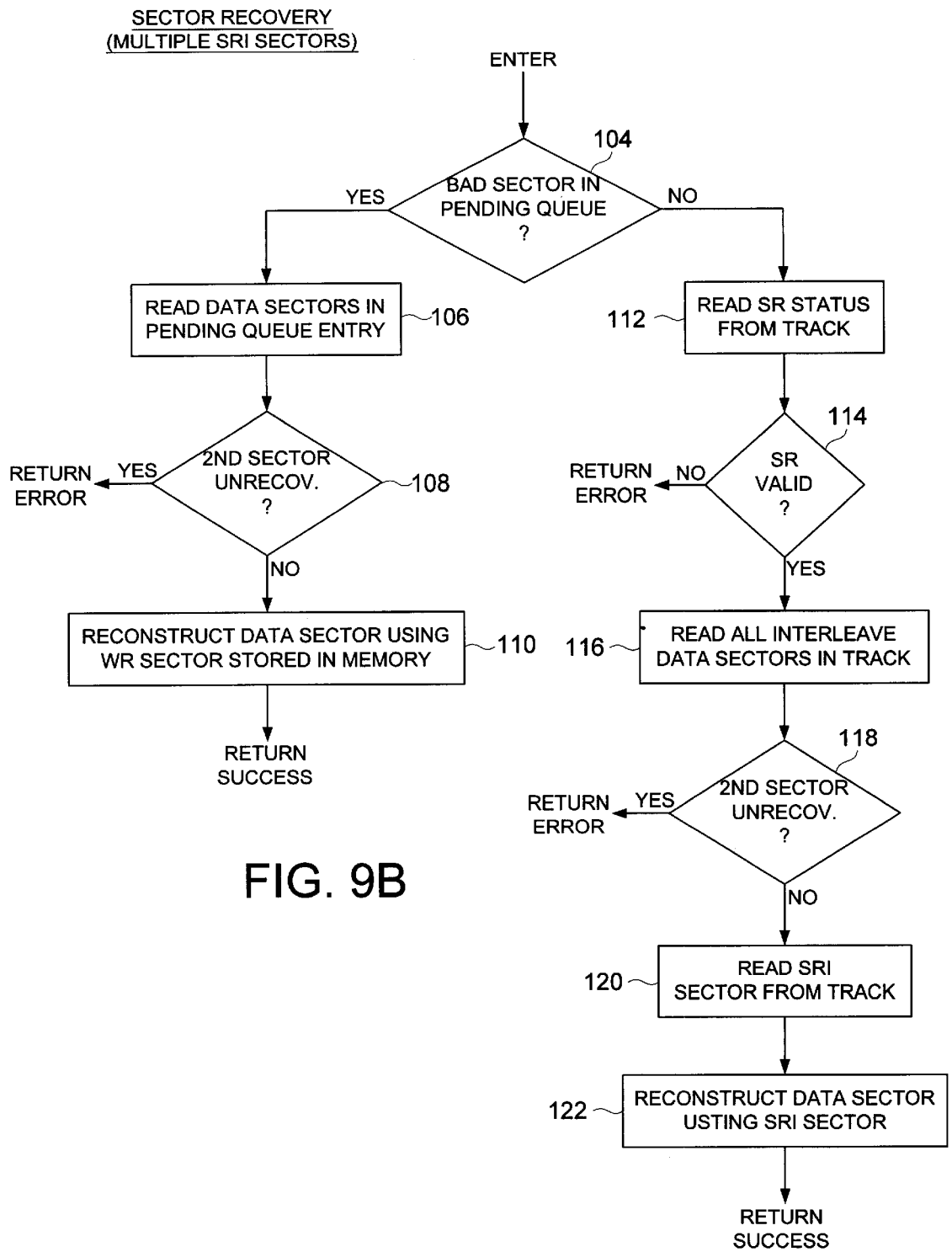
FIG. 9B shows a flow chart illustrating a sector reconstruction procedure using a plurality of SRI sectors according to an embodiment of the present invention.

FIG. 9B is a flow diagram executed by the disk drive to reconstruct an unrecoverable data sector using one of a plurality of SRI sectors. If at step 104 the unrecoverable data sector is in an entry of the pending queue, meaning that it was recently written to the disk, then the corresponding WR sector stored in the semiconductor memory is used to reconstruct the data sector. At step 106 the disk drive attempts to read the data sectors in the pending queue entry (except the unrecoverable data sector). In one embodiment, the disk drive attempts to read the data sectors at step 106 by correcting errors on-the-fly using the sector level ECC. If a data sector is unrecoverable on-the-fly, then the disk drive executes an off-line retry procedure in an attempt to recover the data sector. If after executing the off-line retry procedure a second data sector is still unrecoverable at step 108, then an error is returned. Otherwise, at step 110 the unrecoverable data sector is reconstructed using the WR sector stored in the semiconductor memory. The data sectors read from the disk at step 106 are combined with the WR sector in a suitable manner so as to reconstruct the data sector. In the embodiment wherein the WR sector stores parity data, the data sectors read at step 106 and the WR sector are exclusive-6red to reconstruct the unrecoverable data sector. In the embodiment wherein the WR sector stores multi-bit redundancy values of a more complex error correction code (e.g., Reed-Solomon), the data sectors read at step 106 together with the WR sector are processed to generate error syndromes used to reconstruct the unrecoverable data sector.

If at step 104 the unrecoverable data sector is not in the pending queue, then at step 112 the SR status, which indicates the validity of the SRI sectors, is read from the track. If at step 114 the SR status is INVALID, it means a WR sector stored in the semiconductor memory during a previous write operation has been lost due, for example, to a power failure. The SRI sectors stored on the disk are invalid since data has been written to the track without updating the SRI sectors, therefore the SRI sectors cannot be used to reconstruct the unrecoverable data sector and an error is returned. If at step 114 the SR status is VALID, then at step 116 the disk drive reads all of the data sectors in the interleave of the data sectors stored on the track containing the unrecoverable data sector (the disk drive does not attempt to read the unrecoverable data sector). Similar to step 106, the disk drive performs off-line retry operations when necessary to recovery a data sector. If at step 118 a second unrecoverable data sector is encountered within the interleave (even after the off-line retry operation), then the first unrecoverable data sector cannot be reconstructed using the SRI sector for the interleave and an error is returned. Otherwise, at step 120 the SRI sector for the interleave is read from the track and used at step 122 to reconstruct the unrecoverable data sector. The data sectors read from the disk at step 116 are combined with the SRI sector in a suitable manner so as to reconstruct the data sector. In the embodiment wherein the SRI sector stores parity data, the data sectors read at step 116 and the SRI sector are exclusive-ored to reconstruct the unrecoverable data sector. In the embodiment wherein the SRI sector stores multi-bit redundancy values of a more complex error correction code (e.g., Reed-Solomon), the data sectors read at step 116 together with the SRI sector are processed to generate error syndromes used to reconstruct the unrecoverable data sector.

Figure 9C:
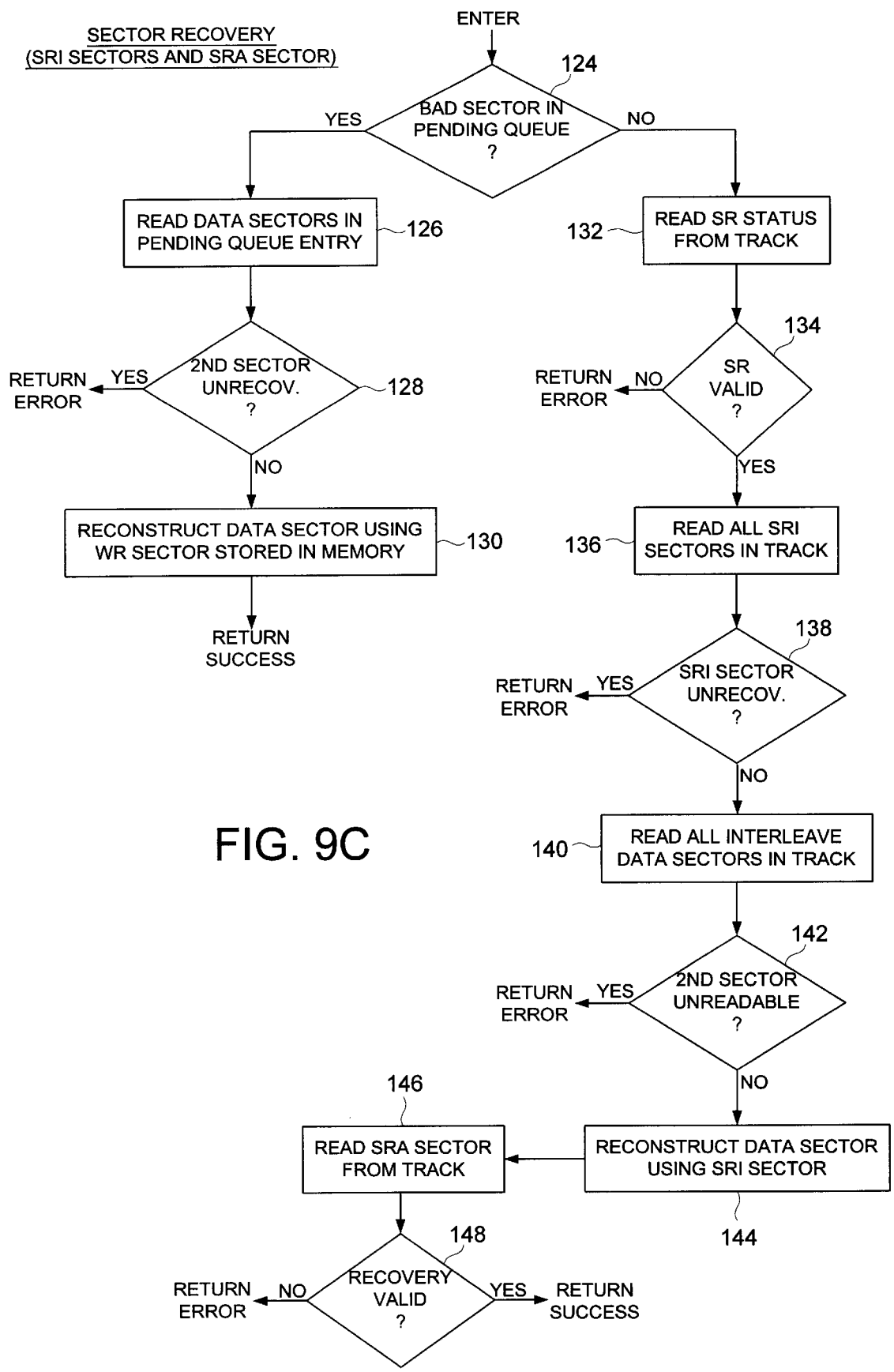
FIG. 9C shows a flow chart illustrating a sector reconstruction procedure using a plurality of SRI sectors and an SRA sector according to an embodiment of the present invention.

FIG. 9C is a flow diagram executed by the disk drive to reconstruct an unrecoverable data sector using one of a plurality of SRI sectors and an SRA sector to verify the reconstruction of the data sector. If at step 124 the unrecoverable data sector is in an entry of the pending queue, meaning that it was recently written to the disk, then the corresponding WR sector stored in the semiconductor memory is used to reconstruct the data sector. At step 126 the disk drive attempts to read the data sectors in the pending queue entry (except the unrecoverable data sector). In one embodiment, the disk drive attempts to read the data sectors at step 126 by correcting errors on-the-fly using the sector level ECC. If a data sector is unrecoverable on-the-fly, then the disk drive executes an off-line retry procedure in an attempt to recover the data sector. If after executing the off-line retry procedure a second data sector is still unrecoverable at step 128, then an error is returned. Otherwise, at step 130 the unrecoverable data sector is reconstructed using the WR sector stored in the semiconductor memory. The data sectors read from the disk at step 126 are combined with the WR sector in a suitable manner so as to reconstruct the data sector. In the embodiment wherein the WR sector stores parity data, the data sectors read at step 126 and the WR sector are exclusive-ored to reconstruct the unrecoverable data sector. In the embodiment wherein the WR sector stores multi-bit redundancy values of a more complex error correction code (e.g., Reed-Solomon), the data sectors read at step 126 together with the WR sector are processed to generate error syndromes used to reconstruct the unrecoverable data sector.

If at step 124 the unrecoverable data sector is not in the pending queue, then at step 132 the SR status, which indicates the validity of the SRI sectors and the SRA sector, is read from the track. If at step 134 the SR status is INVALID, it means a WR sector stored in the semiconductor memory during a previous write operation has been lost due, for example, to a power failure. The SRI sectors and SRA sector stored on the disk are invalid since data has been written to the track without updating the SRI sectors and SRA sector, therefore the SRI sectors cannot be used to reconstruct the unrecoverable data sector and an error is returned. If at step 134 the SR status is VALID, then at step 136 the disk drive reads all of the SRI sectors stored on the track, including the use of an off-line retry procedure if necessary. If at step 138 one or more of the SRI sectors is unrecoverable, then an error is returned. An error is returned even if the SRI sector for the interleave containing the unrecoverable data sector is recoverable since all of the SRI sectors are needed to verify the sector reconstruction using the SRA sector.

If at step 138 all of the SRI sectors are successfully recovered, then at step 140 all of the data sectors in the interleave of the data sectors stored on the track containing the unrecoverable data sector are read (the disk drive does not attempt to read the unrecoverable data sector). Similar to step 126, the disk drive performs off-line retry operations when necessary to recovery a data sector. If at step 142 a second unrecoverable data sector is encountered within the interleave (even after the off-line retry operation), then the first unrecoverable data sector cannot be reconstructed using the SRI sector for the interleave and an error is returned. Otherwise, at step 144 the unrecoverable data sector is reconstructed using the SRI sector for the interleave. The data sectors read from the disk at step 140 are combined with the SRI sector in a suitable manner so as to reconstruct the data sector. In the embodiment wherein the SRI sector stores parity data, the data sectors read at step 140 and the SRI sector are exclusive-ored to reconstruct the unrecoverable data sector. In the embodiment wherein the SRI sector stores multi-bit redundancy values of a more complex error correction code (e.g., Reed-Solomon), the data sectors read at step 140 together with the SRI sector are processed to generate error syndromes used to reconstruct the unrecoverable data sector.

At step 146 the SRA sector is read from the track and combined with the SRI sectors read from the track to verify the reconstruction of the unrecoverable data sector. In the embodiment wherein the SRI sectors and SRA sector store parity data, the SRI sectors and the SRA sector are exclusive-ored step 148. If the result is zero, it indicates a valid reconstruction of the unrecoverable data sector. Otherwise, the reconstruction of the unrecoverable data sector is invalid and an error is returned.

Figure 10:
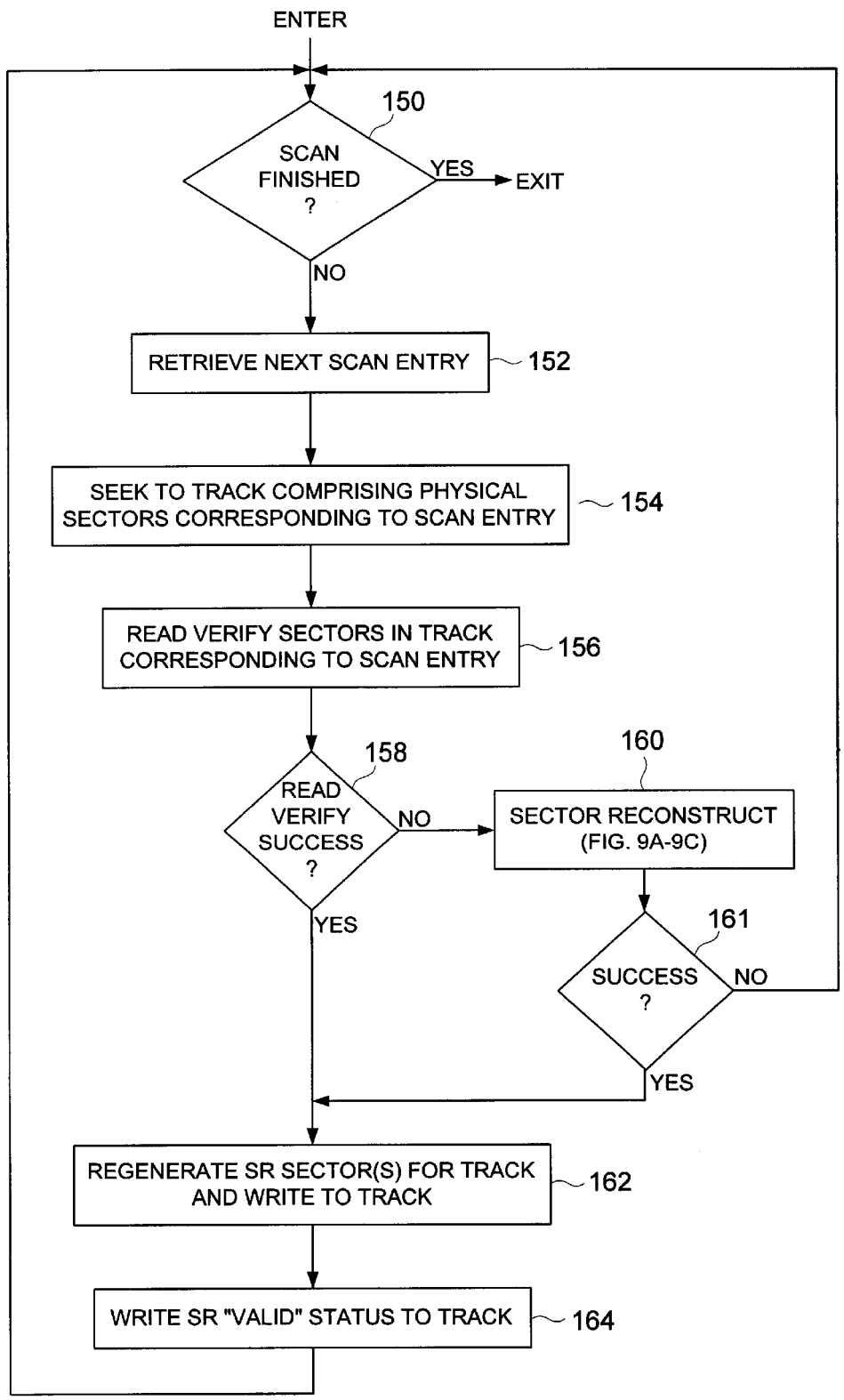
FIG. 10 shows a flow chart illustrating a periodic off-line scan of the disk to reconstruct unrecoverable data sectors and to regenerate the SR sector(s).

FIG. 10 is a flow diagram periodically executed by the disk drive while off-line to read verify the tracks on the disk and regenerate the SR sector(s) according to an embodiment of the present invention. If at step 150 the scan of the disk has finished, meaning that all of the tracks have been scanned, then the off-line procedure exits. Otherwise at step 152 the next scan entry is retrieved and at step 154 the disk drive seeks the head 28 to the track comprising the physical sectors corresponding to the scan entry. At step 156 the disk drive performs a read-verify operation in order to verify that all of the data sectors in the track corresponding to the scan entry can be read. If at step 158 the read-verify is unsuccessful, then at step 160 a sector reconstruction procedure (FIGS. 9A–9C) is executed in an attempt to reconstruct one or more of the unrecoverable data sectors using the SR sector(s). If the read-verify is successful at step 158, or if the unrecoverable data sectors are successfully recovered at step 161, then at step 162 the SR sector(s) for the entire track are regenerated and written to the track. At step 164 the SR status is updated to "VALID" and written to the track to indicate that the SR sector(s) stored on the disk may now be used to reconstruct an unrecoverable data sector encountered during a subsequent read operation. The process then reiterates starting at step 150 for the next entry in the scan queue.

Figure 11:
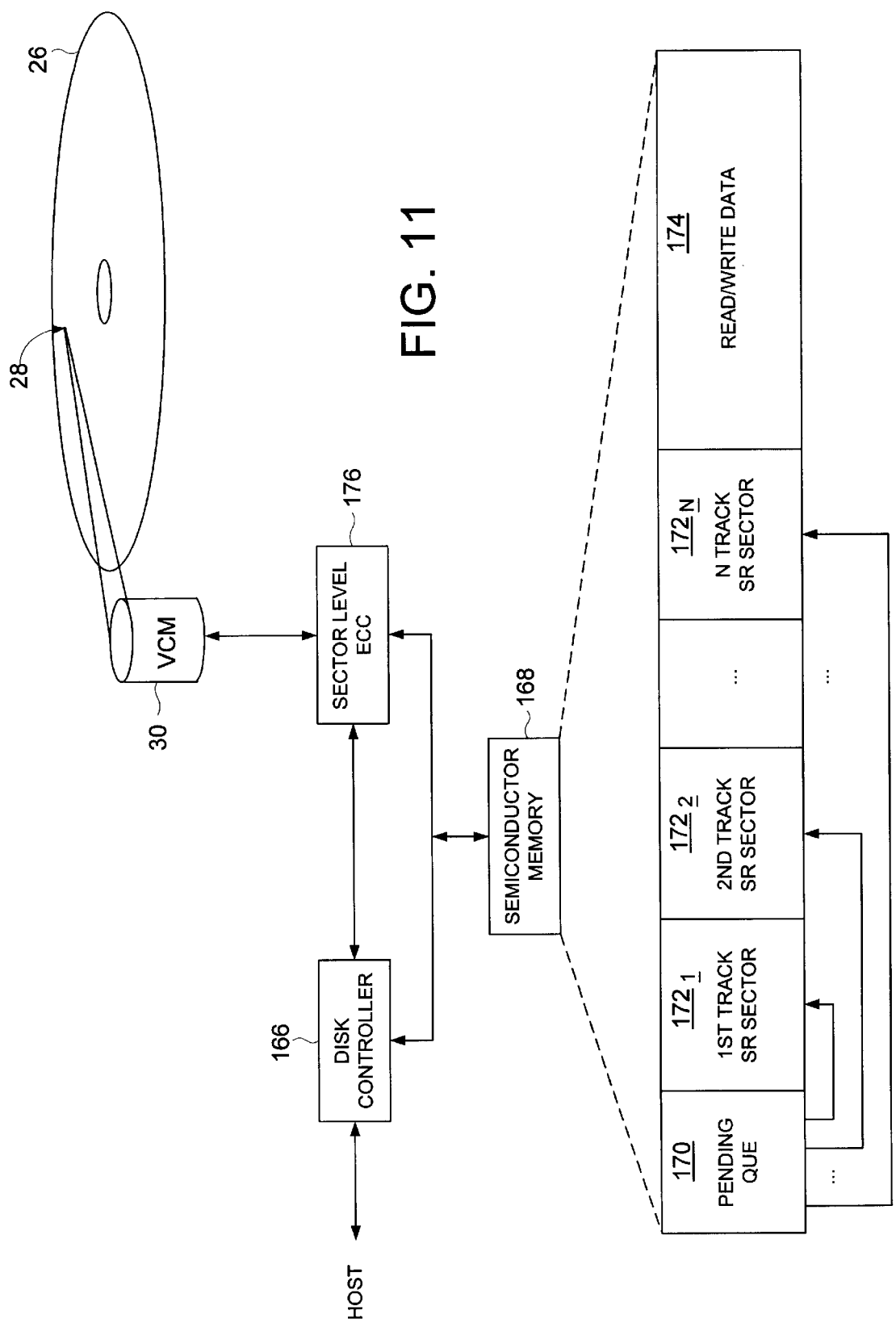
FIG. 11 is a disk drive according to an embodiment of the present invention comprising a sector level ECC, a semiconductor memory, and a disk controller for generating and updating SR sector(s), and for employing the SR sector(s) for reconstructing data sectors unrecoverable at the sector level.

FIG. 11 shows a disk drive according to an embodiment of the present invention comprising a disk 26, a head 28, and an actuator 30 for actuating the head radially over the disk 26. A disk controller 166 interfaces with a host computer system to receive commands to write new data to data sectors on the disk 26, and to read data from data sectors on the disk 26. A semiconductor memory 168 is provided for storing a pending queue 170 which stores entries of recently written tracks, including the sector addresses of the data sectors that were written to. The semiconductor memory 168 also stores a plurality of WR sectors $172_1$–$172_N$ corresponding to recently written tracks. A portion 174 of the semiconductor memory 168 is used to store the new data received from the host computer during a write operation, as well as the data read from the disk 26 during a read operation.

The disk controller 166 comprises a means for writing data to the data sectors, a means for writing the redundancy data to the SR sector, and a means for writing an SR status to at least two of the plurality of sectors, the SR status indicating a validity of the SR sector. The means for performing the above operations may be implemented using a processor for executing firmware or circuitry such as a state machine. In one embodiment the disk controller 166 is implemented as a single integrated circuit. In an alternative embodiment, the disk controller 166 may be implemented as multiple integrated circuits.

Figure 1A:
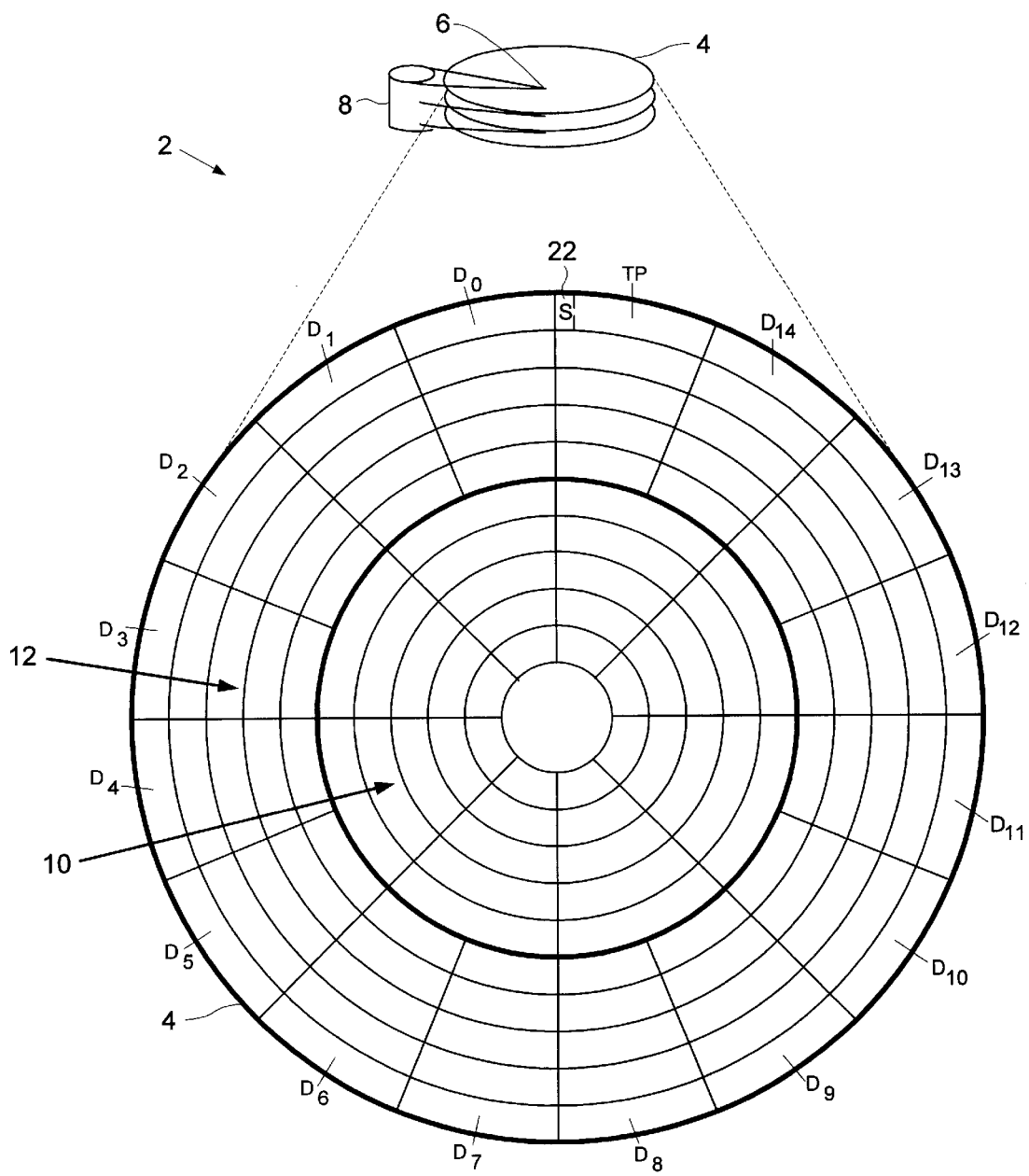
FIG. 1A shows a prior art disk drive employing a track level parity sector for use in reconstructing a data sector unrecoverable at the sector level.
Figure 1B:
FIG. 1B shows a prior art format of a data sector, including sector level ECC redundancy symbols appended to the end of the data sector.

When new data is written to a track during a write operation, the disk controller 166 retrieves the existing entry for the track from the pending queue, or creates a new entry if one does not already exist. The new data received from the host processed to generate the WR sector for the track (memory for a new WR sector is allocated if one does not already exist in the memory 168). In the embodiment wherein the WR sector stores parity data, the new data is exclusive-ored to generate the WR sector. In the embodiment wherein the WR sector stores multi-bit redundancy values of a more complex error correction code (e.g., Reed-Solomon), the new data is processed to generate niulti-bit redundancy values stored in the WR sector. The new data stored in the semiconductor memory 168 is then processed by a sector level ECC 176 to generate the ECC symbols 20 (FIG. 1B) appended to the end of a new data sector written to the disk 26. During idle-time, the disk drive performs a read-verify to verify that the new sectors just written can be read. If an unrecoverable data sector is encountered during the read-verify, the WR sector stored in the semiconductor memory 168 is used to reconstruct the data sector (see FIG. 7).

During a read operation, the sector level ECC 176 is used to detect and correct errors on-the-fly in the data sectors read from the disk 26. If a data sector is unrecoverable using the sector level ECC 176, then the SR sector(s) stored on the disk 26 is used to reconstruct the data sector (see FIGS. 9A–9C). The disk controller 166 may execute a retry operation in an attempt to recover additional data sectors if necessary during the reconstruction process.

In another embodiment of the present invention, the SR sector(s) are used to enhance the disk drive's retry operation. If a data sector is unrecoverable using the sector level ECC 176, rather than perform a retry operation immediately, the SR sector(s) stored on the disk 26 is used to reconstruct the data sector. If the data sector cannot be successfully reconstructed using the SR sector(s), then a retry procedure is executed in an attempt to recover the data sector. As previously described, the retry procedure adjusts various parameters in the disk drive (e.g., in the read channel) and attempts to reread the data sector. If the data sector can be successfully reconstructed using the SR sector(s), then at least part of the latency associated with the retry operation may be avoided.

I claim:

1. A disk drive comprising:
   a disk;
   a head; and
   an actuator for actuating the head radially over the disk, wherein:
   (a) the disk comprises a plurality of tracks;
   (b) each track comprises a plurality of sectors;
   (c) the plurality of sectors comprise a plurality of data sectors for storing data and at least one sector-reconstruction (SR) sector for storing redundancy data generated in response to the data stored in at least one of the data sectors; and
   (d) at least two of the plurality of sectors of a track for storing a SR status indicating a validity of the SR sector stored on the track.

2. The disk drive as recited in claim 1, wherein:
   (a) at least one of the tracks comprises a plurality of SR sectors, where each of the plurality SR sectors is a sector-reconstruction-interleave (SRI) sector for storing redundancy data; and
   (b) the redundancy data stored in a selected one of the SRI sectors is generated in response to the data stored in an interleave of the data sectors corresponding to the selected one of the SRI sectors.
   (c) the plurality of SRI sectors for storing the SR status.

3. The disk drive as recited in claim 2, wherein the plurality of SRI sectors for storing the SR status.

4. The disk drive as recited in claim 2, wherein the redundancy data stored in at least one of the SRI sectors is generated by computing a parity over the data stored in a respective interleave of the data sectors.

5. The disk drive as recited in claim 2, wherein:
   (a) the data stored in each interleave of the data sectors represent data polynomials; and
   (b) the redundancy data stored in the SRI sectors is generated by dividing the data polynomials by a generator polynomial.

6. The disk drive as recited in claim 1, wherein:
   (a) at least one of the tracks comprises two SR sectors, where each of the two SR sectors is sector-reconstruction-interleave (SRI) sector for storing redundancy data;
   (b) the redundancy data stored in a selected one of the SRI sectors is generated in response to the data stored in an interleave of the data sectors corresponding to the selected one of the SRI sectors;
   (c) the first interleave of data sectors comprises data sectors [0, 2, 4, . . . ]; and
   (d) the second interleave of data sectors comprises data sectors [ 1, 3, 5, . . . ].

7. The disk drive as recited in claim 1, wherein:
   (a) at least one of the tracks comprises three SR sectors, where each of the three SR sectors is a sector-reconstruction-interleave (SRI) sector for storing redundancy data;
   (b) the redundancy data stored in a selected one of the SRI sectors is generated in response to the data stored in an interleave of the data sectors corresponding to the selected one of the SRI sectors;
   (c) the first interleave of data sectors comprises data sectors [0, 3, 6, . . . ];
   (d) the second interleave of data sectors comprises data sectors [1, 4, 7, . . . ]; and
   (e) the third interleave of data sectors comprises data sectors [2, 5, 8, . . . ].

8. The disk drive as recited in claim 1, wherein:
   (a) at least one of the tracks comprises n SR sectors, where each of the n SR sectors is a sector-reconstruction-interleave (SRI) sector for storing redundancy data;
   (b) the redundancy data stored in a selected one of the SRI sectors is generated in response to the data stored in an interleave of the data sectors corresponding to the selected one of the SRI sectors;
   (c) n is greater than three; and
   (d) each interleave of data sectors comprises every nth data sector offset by the interleave number.

9. The disk drive as recited in claim 1, wherein:
   (a) the SR sector is a sector-reconstruction-all (SRA) sector for storing redundancy data; and
   (b) the redundancy data stored in the SRA sector is generated in response to the data stored in at least two interleaves of the data sectors of a track.

10. The disk drive as recited in claim 9, wherein:
    (a) at least one track comprises a plurality of additional SR sectors, each additional SR sector is a sector-reconstruction-interleave (SRI) sector for storing redundancy data;
    (b) the redundancy data stored in a selected one of the SRI sectors is generated in response to the data stored in an interleave of the data sectors corresponding to the selected one of the SRI sectors; and
    (c) the SRA sector is used to verify a data sector reconstructed using at least one of the SRI sectors.

11. The disk drive as recited in claim 1, further comprising a disk controller and a semiconductor memory, wherein when the disk controller receives write data from a host to be written to a track on the disk:
    (a) the disk controller generates a write-reconstruction (WR) sector over the write data and stores the WR sector in the semiconductor memory;
    (b) the disk controller writes the write data to at least one of the plurality of data sectors, and
    (c) the disk controller writes the SR status to at least one of the at least two sectors for storing the SR status.

12. The disk drive as recited in claim 1, further comprising a disk controller and a semiconductor memory, wherein:
   at least one of the tracks comprises a plurality of SR sectors, where each of the plurality of SR sectors is a sector-reconstruction-interleave (SRI) sector for storing redundancy data,
   the redundancy data stored in a selected one of the SRI sectors is generated in response to the data stored in an interleave of the data sectors corresponding to the selected one of the SRI sectors; and
   when the disk controller receives write data from a host to be written to a track on the disk:
      (a) the disk controller generates a write-reconstruction (WR) sector over the write data and stores the WR sector in the semiconductor memory;
      (b) the disk controller writes the write data to at least one of the plurality of data sectors, and
      (c) the disk controller invalidates at least one of the SRI sectors by writing spurious data to the SRI sector.

13. The disk drive as recited in claim 12, wherein the at least one of the tracks comprises a sector-reconstruction-all (SRA) sector for storing redundancy data generated in response to the data stored in at least two interleaves of the data sectors of a track, wherein during a read operation:
   (a) the disk controller reads the SRI sectors and the SRA sector; and
   (b) the disk controller combines the data read from the SRI sectors and the SRA sector to determine the validity of the SRI sectors and the SRA sector.

14. A disk drive comprising:
   (a) a disk comprising a plurality of tracks, each track comprising a plurality of sectors, the plurality of sectors comprise a plurality of data sectors for storing data and at least one sector-reconstruction (SR) sector for storing redundancy data generated in response to the data stored in at least one of the data sectors;
   (b) a head;
   (c) an actuator for actuating the head radially over the disk; and
   (d) a disk controller for:
      writing data to the data sectors;
      writing the redundancy data to the SR sector; and
      writing an SR status to at least two of the plurality of sectors, the SR status indicating a validity of the SR sector.

15. The disk drive as recited in claim 14, wherein:
   (a) at least one of the tracks comprises a plurality of SR sectors, where each of the plurality of SR sectors is a sector-reconstruction-interleave (SRI) sector for storing redundancy data; and
   (b) the redundancy data stored in a selected one of the SRI sectors is generated in response to the data stored in an interleave of the data sectors corresponding to the selected one of the SRI sectors.

16. The disk drive as recited in claim 15, wherein the plurality of SRI sectors for storing the SR status.

17. The disk drive as recited in claim 15, wherein the redundancy data stored in at least one of the SRI sectors is generated by computing a parity over the data stored in a respective interleave of the data sectors.

18. The disk drive as recited in claim 15, wherein:
   (a) the data stored in each interleave of the data sectors represent data polynomials; and
   (b) the redundancy data stored in the SRI sectors is generated by dividing the data polynomials by a generator polynomial.

19. The disk drive as recited in claim 14, wherein:
   (a) at least one of the tracks comprises two SR sectors, where each of the two SR sectors is a sector-reconstruction-interleave (SRI) sector corresponding to a first and second interleaves of the data sectors;
   (b) the redundancy data stored in a selected one of the SRI sectors is generated in response to the data stored in an interleave of the data sectors corresponding to the selected one of the SRI sectors,
   (c) the first interleave of data sectors comprises data sectors [0, 2, 4, . . . ]; and
   (d) the second interleave of data sectors comprises data sectors [1, 3, 5, . . . ].

20. The disk drive as recited in claim 14, wherein:
   (a) at least one of the tracks comprises three SR sectors, where each of the three SR sectors is a sector-reconstruction-interleave (SRI) sector corresponding to a first, second and third interleaves of the data sectors;
   (b) the redundancy data stored in a selected one of the SRI sectors is generated in response to the data stored in an interleave of the data sectors corresponding to the selected one of the SRI sectors;
   (c) the first interleave of data sectors comprises data sectors [0, 3, 6, . . . ];
   (d) the second interleave of data sectors comprises data sectors [1, 4, 7, . . . ]; and
   (e) the third interleave of data sectors comprises data sectors [2, 5, 8, . . . ].

21. The disk drive as recited in claim 14, wherein:
   (a) at least one of the tracks comprises n SR sectors, where each of the n SR sectors is a sector-reconstruction-interleave (SRI) sectors corresponding to n interleaves of the data sectors;
   (b) the redundancy data stored in a selected one of the SRI sectors is generated in response to the data stored in an interleave of the data sectors corresponding to the selected one of the SRI sectors;
   (c) n is greater than three; and
   (d) each interleave of data sectors comprises every nth data sector offset by the interleave number.

22. The disk drive as recited in claim 14, wherein:
   (a) the SR sector is a sector-reconstruction-all (SRA) sector for storing redundancy data; and
   (b) the redundancy data stored in the SRA sector is generated in response to the data stored in at least two interleaves of the data sectors of a track.

23. The disk drive as recited in claim 22, wherein:
   (a) at least one track comprises a plurality of additional SR sectors, each additional SR sector is a sector-reconstruction-interleave (SRI) sector for storing redundancy data;
   (b) the redundancy data stored in a selected one of the SRI sectors is generated in response to the data stored in an interleave of the data sectors corresponding to the selected one of the SRI sectors; and
   (c) the disk controller uses the SRA sector to verify a data sector reconstructed using at least one of the SRI sectors.

24. The disk drive as recited in claim 14, further comprising a semiconductor memory, wherein when the disk controller receives write data from a host to be written to a track on the disk:
   (a) the disk controller generates a write-reconstruction (WR) sector over the write data and stores the WR sector in the semiconductor memory;

(b) the disk controller writes the write data to at least one of the plurality of data sectors, and (c) the disk controller writes the SR status to at least one of the at least two sectors for storing the SR status.

25. The disk drive as recited in claim 14, further comprising a semiconductor memory, wherein:

at least one of the tracks comprises a plurality of SR sectors, where each of the plurality of SR sectors is a sector-reconstruction-interleave (SRI) sector for storing redundancy data;

the redundancy data stored in a selected one of the SRI sectors is generated in response to the data stored in an interleave of the data sectors corresponding to the selected one of the SRI sectors; and when the disk controller receives write data from a host to be written to a track on the disk:

(a) the disk controller generates a write-reconstruction (WR) sector over the write data and stores the WR sector in the semiconductor memory;

(b) the disk controller writes the write data to at least one of the plurality of data sectors; and (c) the disk controller invalidates at least one of the SRI sectors by writing spurious data to the SRI sector.

26. The disk drive as recited in claim 25, wherein at least one of the tracks comprises a sector-reconstruction-all (SRA) sector for storing redundancy data generated in response to the data stored in at least two interleaves of the data sectors of a track, wherein during a read operation:

(a) the disk controller reads the SRI sectors and the SRA sector; and (b) the disk controller combines the data read from the SRI sectors and the SRA sector to determine the validity of the SRI sectors and the SRA sector.

27. A disk controller for use in a disk drive comprising a disk comprising a plurality of tracks, each track for storing a plurality of sectors, the plurality of sectors comprise a plurality of data sectors for storing data and at least one sector-reconstruction (SR) sector for storing redundancy data generated in response to the data stored in at least one of the data sectors, a head, an actuator for actuating the head radially over the disk, and the disk controller comprising:

(a) a means for writing data to the data sectors;

(b) a means for writing the redundancy data to the SR sector; and (c) a means for writing an SR status to at least two of the plurality of sectors, the SR status indicating a validity of the SR sector.

28. The disk controller as recited in claim 27, wherein:

(a) at least one of the tracks for storing a plurality of SR sectors, where each of the plurality of SR sectors is a sector-reconstruction-interleave (SRI) sector for storing redundancy data; and (b) the redundancy data stored in a selected one of the SRI sectors is generated in response to the data stored in an interleave of the data sectors corresponding to the selected one of the SRI sectors.

29. The disk controller as recited in claim 28, wherein the plurality of SRI sectors for storing the SR status.

30. The disk controller as recited in claim 28, wherein the redundancy data stored in at least one of the SRI sectors is generated by computing a parity over the data stored in a respective interleave of the data sectors.

31. The disk controller as recited in claim 28, wherein:

(a) the data stored in each interleave of the data sectors represent data polynomials; and (b) the redundancy data stored in the SRI sectors is generated by dividing the data polynomials by a generator polynomial.

32. The disk controller as recited in claim 27, wherein:

(a) at least one of the tracks for storing two SR sectors, where each of the two SR sectors is a sector-reconstruction-interleave (SRI) sector corresponding to a first and second interleaves of the data sectors;

(b) the redundancy data stored in a selected one of the SRI sectors is generated in response to the data stored in an interleave of the data sectors corresponding to the selected one of the SRI sectors;

(c) the first interleave of data sectors comprises data sectors [0, 2, 4, . . . ]; and (d) the second interleave of data sectors comprises data sectors [1, 3, 5, . . . ].

33. The disk controller as recited in claim 27, wherein:

(a) at least one of the tracks for storing three SR sectors, where each of the three SR sectors is a sector-reconstruction-interleave (SRI) sectors corresponding to a first, second and third interleaves of the data sectors, (b) the redundancy data stored in a selected one of the SRI sectors is generated in response to the data stored in an interleave of the data sectors corresponding to the selected one of the SRI sectors;

(c) the first interleave of data sectors comprises data sectors [0, 3, 6, . . . ];

(d) the second interleave of data sectors comprises data sectors [1, 4, 7, . . . ]; and (e) the third interleave of data sectors comprises data sectors [2, 5, 8, . . . ].

34. The disk controller as recited in claim 27, wherein:

(a) at least one of the tracks for storing n SR sectors, where each of the n SR sectors is a sector-reconstruction-interleave (SRI) sectors corresponding to n interleaves of the data sectors;

(b) the redundancy data stored in a selected one of the SRI sectors is generated in response to the data stored in an interleave of the data sectors corresponding to the selected one of the SRI sectors;

(c) n is greater than three; and (d) each interleave of data sectors comprises every nth data sector offset by the interleave number.

35. The disk controller as recited in claim 27, wherein:

(a) the SR sector is a sector-reconstruction-all (SRA) sector; and (b) the disk controller further comprises a means for generating redundancy data in response to the data stored in at least two interleaves of the data sectors of a track, and a means for writing the redundancy data to the SRA sector.

36. The disk controller as recited in claim 35, wherein:

(a) at least one track for storing a plurality of additional SR sectors, each additional SR sector is sector-reconstruction-interleave (SRI) sectors for storing redundancy data;

(b) the disk controller further comprising a means for generating the redundancy data stored in each SRI sector in response to the data stored in a respective interleave of the data sectors; and (c) the disk controller further comprising a means for using the SRA sector to verify a data sector reconstructed using at least one of the SRI sectors.

37. The disk controller as recited in claim 27, the disk drive further comprising a semiconductor memory, wherein the disk controller further comprises:

(a) a means for receiving write data from a host to be written to a track on the disk:

(b) a means for generating a write-reconstruction (WR) sector over the write data;

(c) a means for storing the WR sector in the semiconductor memory;

(d) a means for writing the write data to at least one of the plurality of data sectors; and (e) a means for writing the SR status to at least one of the at least two sectors for storing the SR status.

38. The disk controller as recited in claim 27, wherein:

the disk drive further comprising a semiconductor memory;

at least one of the tracks comprises a plurality of SR sectors, where each of the plurality of SR sectors is a sector-reconstruction-interleave (SRI) sector for storing redundancy data;

the redundancy data stored in a selected one of the SRI sectors is generated in response to the data stored in an interleave of the data sectors corresponding to the selected one of the SRI sectors; and the disk controller further comprises:

(a) a means for receiving write data from a host to be written to a track on the disk;

(b) a means for generating a write-reconstruction (WR) sector over the write data;

(c) a means for storing the WR sector in the semiconductor memory;

(d) a means for writing the write data to at least one of the plurality of data sectors; and (e) a means for invalidating at least one of the SRI sectors by writing spurious data to the SRI sector.

39. The disk controller as recited in claim 38, wherein:

at least one of the tracks for storing a sector-reconstruction-all (SRA) sector for storing redundancy data generated in response to the data stored in at least two interleaves of the data sectors of a track;

the disk controller further comprising:

(a) a means for reading the SRI sectors and the SRA sector; and (b) a means for combining the data read from the SRI sectors and the SRA sector to determine the validity of the SRI sectors and the SRA sector.

\* \* \* \* \*